United States Patent [19]

Boains, Jr.

[11] Patent Number: 4,696,153
[45] Date of Patent: Sep. 29, 1987

[54] LAWN MOWER BLADE SAFETY ASSEMBLY

[76] Inventor: Maurice Boains, Jr., 124 Audubon Ave., Newington, Conn. 06111

[21] Appl. No.: 826,306

[22] Filed: Feb. 5, 1986

[51] Int. Cl.⁴ .......................................... A01D 55/18
[52] U.S. Cl. .................................................. 56/295
[58] Field of Search ................. 30/276, 296 R, 388; 56/17.4, 17.5, 255, 295, DIG. 20

[56] References Cited

U.S. PATENT DOCUMENTS

| | | |
|---|---|---|
| 3,157,978 | 11/1964 | McMullen ............................ 56/295 |
| 3,252,304 | 5/1966 | Moody . |
| 3,481,124 | 12/1969 | Machovina . |
| 3,545,189 | 12/1970 | Gillaspie et al. ...................... 56/295 |
| 4,189,905 | 2/1980 | Frantello . |
| 4,205,510 | 6/1980 | Raniero . |
| 4,357,789 | 11/1982 | Rodish . |
| 4,413,468 | 11/1983 | Hockersmith ........................ 56/295 |
| 4,428,184 | 1/1984 | Hoff .................................... 56/295 |

Primary Examiner—Stephen J. Novosad
Assistant Examiner—William P. Neuder

[57] ABSTRACT

A fail-safe system for a power-driven rotary lawn mower having a conventional, propeller-like blade utilizes a bearing assembly mounted upon the drive shaft and connected to the blade by cables. Upon accidental disconnection of the blade from the shaft during operation of the machine, the cables will catch the blade and prevent its ejection, and will thrust the bearing assembly against a retaining collar rigidly mounted upon the shaft outwardly thereof. The bearing will permit free-wheeling action of the blade while retarding rotation relative to the shaft, thereby safely retaining it until the operator has an opportunity to stop the machine.

19 Claims, 10 Drawing Figures

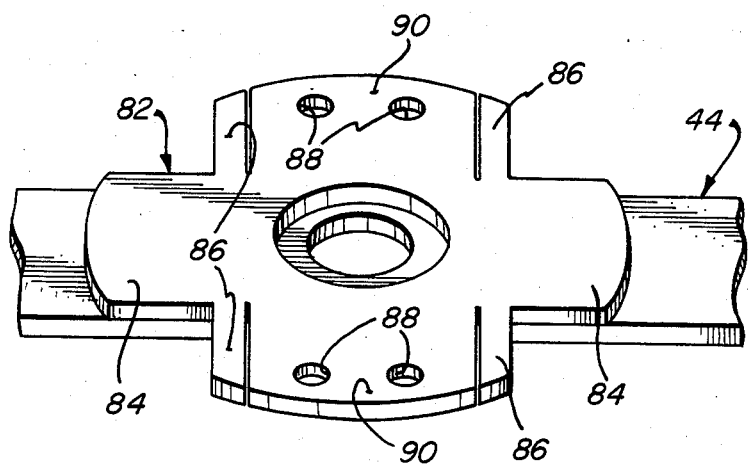
FIG. 9
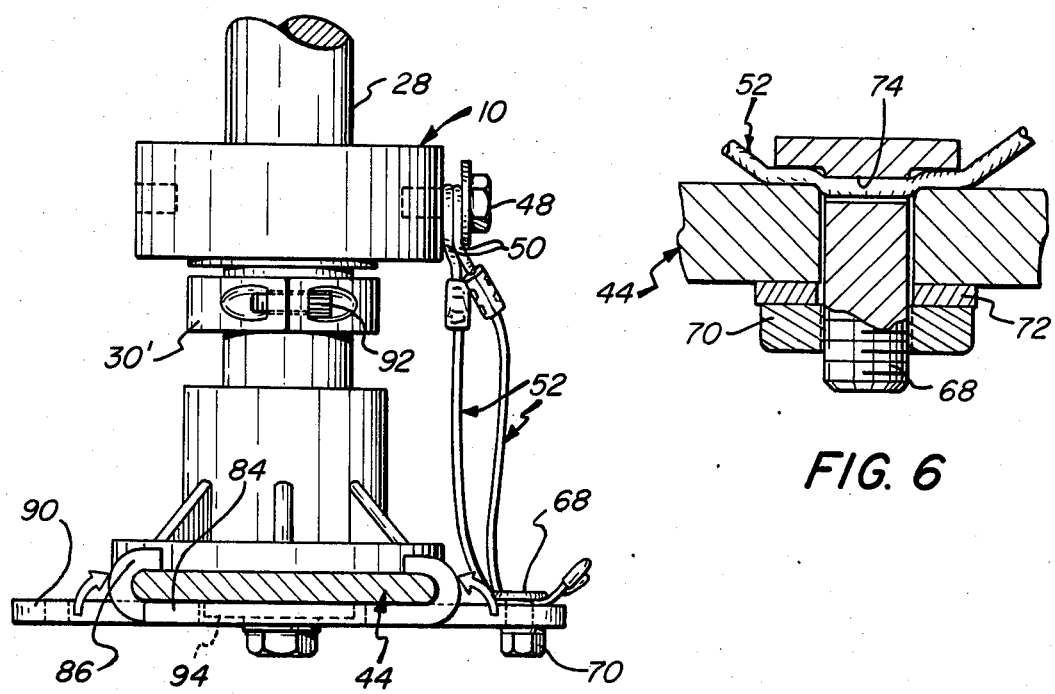
FIG. 6
FIG. 10
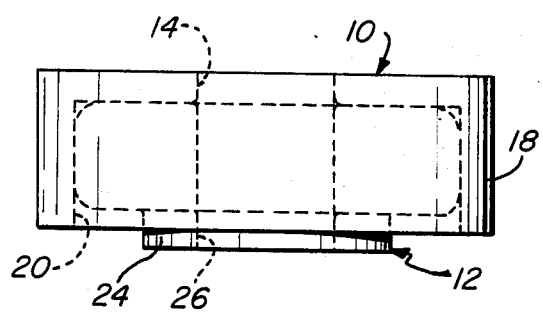
FIG. 2

LAWN MOWER BLADE SAFETY ASSEMBLY

BACKGROUND OF THE INVENTION

Despite good design and high-quality manufacture, there is an ever-present danger that the blades of power-driven rotary lawn mowers will become disconnected from their drive shafts, and will thereupon be ejected from the shroud or housing of the machine. This can occur for example due to impact of the blade upon rocks and other obstructions, or as a result of failure of the normal mounting structure due to other causes.

Although certain dangerous features of rotary power lawn mowers have previously been recognized, the patent art appears to be concerned primarily with the provision of means for protecting against objects that may be thrown by the blade. Illustrative United States patents include the following:

Machovina U.S. Pat. No. 3,481,124 discloses a grid-type guard that is disposed across the bottom of a lawn mower housing to protect the user from flying objects, and to prevent contact with the rotating blade.

Raniero U.S. Pat. No. 4,205,510 discloses a lawn mower apparatus comprising a cutting wheel disposed within a blade cover, and a protective housing supported thereon.

Frantello U.S. Pat. No. 4,189,905 substitutes monofilament cutters, disposed on a compressible spool hub, for conventional metal blades.

Rodish U.S. Pat. No. 4,357,789 utilizes a blade assembly in which the cutting elements are torsion spring members which project from a ring-like structure attached to a hub by a set of spokes.

Consequently, it is an object of the present invention to provide a novel fail-safe system for preventing ejection of a conventional rotary lawn mower blade, upon accidental disconnection or failure of its normal mounting structure.

A more specific object of the invention is to provide such a system which is of symmetrical form, so as to introduce no imbalancing effect into the machine on which it is installed.

Additional objects are to provide such a system which is relatively inexpensive to produce and facile to install, which can be provided as an add-on assembly, and which can be used with minimal modification to standard blades.

A further object of the invention is to provide a novel power-driven rotary lawn mower into which a fail-safe system having the foregoing features and advantages is incorporated.

SUMMARY OF THE INVENTION

It has now been found that certain of the foregoing and related objects of the invention are readily attained in a fail-safe system comprising a bearing assembly, a retainer, and connecting means. The bearing assembly is comprised of an attachment member and a hub member journalled therewithin. It has an axial passageway for slideable and rotatable mounting upon the cylindrical drive shaft of a lawn mower, and the retainer is adapted for affixation to the drive shaft adjacent the bearing assembly. The components are constructed so as to permit engagement of the hub member of the bearing assembly with the retainer, free from interference with the attachment member, and the connecting means is adapted to symmetrically connect the attachment member to a blade mounted upon the drive shaft of the lawn mower, with the retainer disposed therebetween.

In preferred embodiments of the system, the bearing assembly will comprise a housing (providing the attachment member thereof) and a bearing comprised of two parts, of generally annular configuration, assembled with one another for relative rotation. One of the bearing parts will be fixedly engaged within the housing, and the other will project axially therefrom for contact with the retainer, which will advantageously be in the form of a clamping collar adapted to encircle the drive shaft.

The connecting means will usually comprise a plurality of relatively flexible metal wire cables, dimensioned to extend between the attachment member and a blade mounted in normal position upon the drive shaft, with the retainer disposed therebetween. The connecting means may additionally include a plurality of anchor bolts adapted to attach the cables to the blade; generally, four cables and anchor bolts will be employed in such a case. Alternatively, two cables may be used, each having a loop formed in one end thereof dimensioned to extend somewhat loosely about the blade. A cushioning element will advantageously be used with each of such cables, the elements extending tightly about the blade in positions within the cable loops. As another alternative, the connecting means may include an adaptor that can be affixed to the blade and will provide means for attachment of the cables.

Other objects of the invention are attained by the provision of a power-driven rotary lawn mower including, in combination, a cylindrical drive shaft having an outer end portion, a blade attached substantially at its center to the outer end portion of the drive shaft and extending diametrically thereof, and a fail-safe system for the blade, as hereinbefore described. The lawn mower will usually include a coupling fixture having a socket in one side, for engaging the end portion of the drive shaft, and having a generally planar surface on the opposite side, against which a relatively flat central portion of the blade will bear, for stable support.

BRIEF DESCRIPTION OF THE DRAWINGS

FIG. 2 is an elevational view of a bearing assembly utilized in the system of the invention;

FIG. 6 is a fragmentary view, in partial section and also drawn to an enlarged scale, showing a portion of the blade with an anchor bolt clamping one of the braking cables thereto;

FIG. 9 is a fragmentary perspective view of an adaptor plate superimposed upon a cutting blade; and FIG. 10 is a fragmentary elevational view, in partial section, of the blade-mounting portion of a lawn mower incorporating another fail-safe system embodying the invention, which employs the adaptor plate of the foregoing Figure.

DETAILED DESCRIPTION OF THE PREFERRED AND ILLUSTRATED EMBODIMENTS

Figure 1:
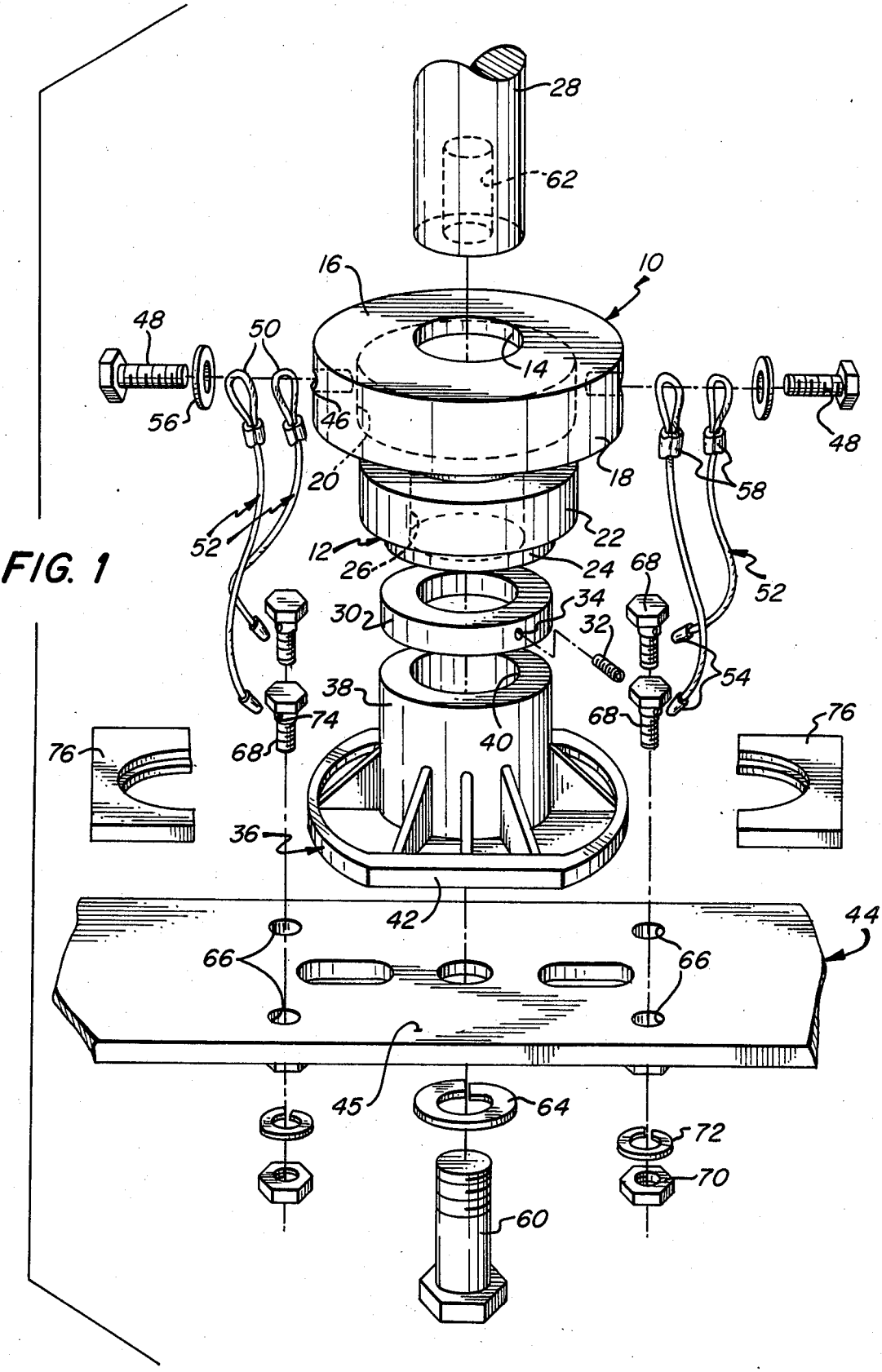
FIG. 1 is a fragmentary, exploded perspective view of the blade-mounting portion of a power-driven rotary lawn mower, including a fail-safe system embodying the present invention.

Turning now in detail to FIGS. 1-5 of the invention, therein illustrated is a fail-safe system embodying the present invention. It includes a bearing assembly consisting of a cup-shaped housing and a two-part bearing, generally designated respectively by the numerals 10 and 12. The housing has a circular hole 14 centrally disposed in its end wall 16, and the circular sidewall 18 cooperates with the end wall 16 to define a cavity 20 therewithin.

The bearing 12 consists of two annular parts 22, 24 of relatively large and relatively small diameter, respectively, which are coaxially aligned and rotatably assembled with one another. The relatively large part 22 is press-fit into the cavity 20 of the housing 10, frictionally engaging the sidewall 18 thereof with the smaller part 24 protruding slightly below its lower edge. The axial passageway 26 of the bearing 12 is aligned with the housing hole 14, both of which are dimensioned to slideably and rotatably receive the lower end portion 28 of the lawn mower motor shaft. A collar clamp 30 is affixed adjacent the bearing assembly by tightening the set screw 32, which is received within the radially extending threaded aperture 34, against the shaft.

A standard universal coupling fixture, generally designated by the numeral 36, is placed upon the end portion 28 of the motor shaft by inserting the shaft into the axially extending socket 40 provided within the cylindrical hub portion 38 of the fixture, which has a bottom wall element (not visible) against which it is securely seated. A flange portion 42, of straight-sided oval configuration, is formed at the base of the hub portion 38, and has a planar bottom face (not visible) for stable support of the mower blade, generally designated by the numeral 44; the blade has a corresponding flat central area 45. As will be appreciated, the blade 44 is of propeller-like form, as is normally used in power-driven rotary mowers.

Two diametrically aligned threaded apertures 46 extend into the bearing housing 10, and receive bolts 48. Each bolt passes through the looped end portions 50 of two braided wire braking cables, generally designated by the numerals 52, and a suitable washer 56 is inserted under the heads thereof. The loops in the cables are maintained by crimped metal sleeves 58, and the opposite end portions of the cables advantageously have a coating 54 of plastic material thereon, to prevent any fraying that might otherwise occur.

The blade 44 has a central hole 58 through which a main mounting bolt 60 is inserted; the bolt (with a lock washer 64) is engaged within the threaded axial bore 62 of the motor shaft end portion 28, providing the normal mounting means for the blade. Four auxilliary holes 66 are also formed through the blade 44 at locations spaced equidistantly to opposite sides of both the longitudinal and transverse centerlines, i.e., in a symmetrical arrangement on the blade; as will be noted, the transverse distances need not be the same as the longitudinal distances involved. An anchor bolt 68 is affixed within each of the holes 66 by a nut 70 and lock washer 72, and serves to secure the end portion of one of the braking cables 52 by threading it through the transverse aperture 74 and tightening the bolt against the blade 44 with the associated nut 70, as best illustrated in FIG. 6.

Figure 5:
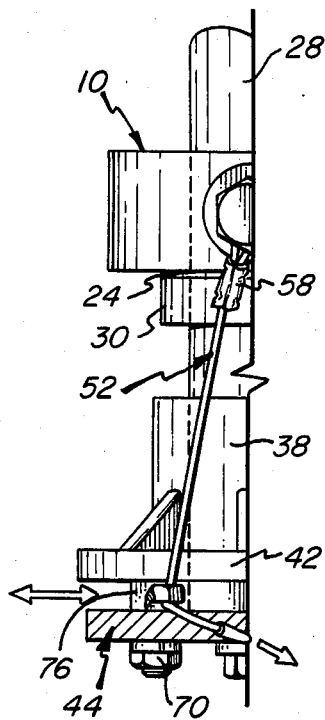
FIG. 5 is a fragmentary view similar to FIG. 3, showing only the section to the left of the motor shaft centerline and depicting an intermediate phase of the assembly operation.
Figure 3:
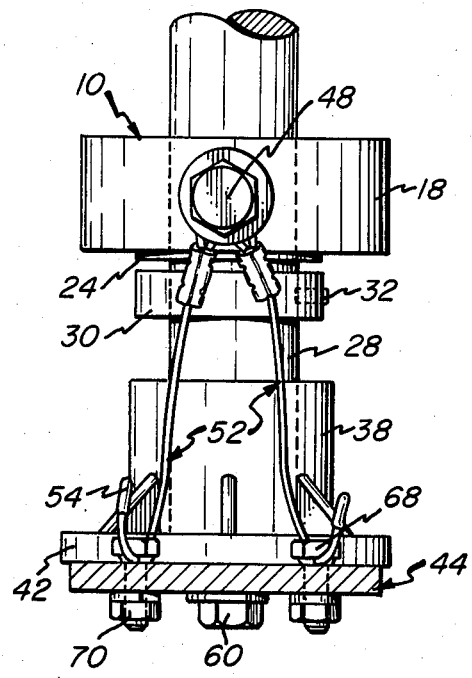
FIG. 3 is a fragmentary elevational view of the portion of the lawn mower shown in FIG. 1, with the components in assembled condition.
Figure 4:
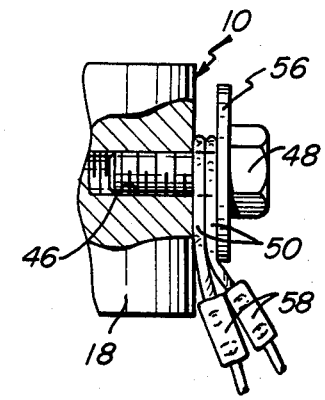
FIG. 4 is a fragmentary elevational view of the bearing housing, drawn to an enlarged scale and with a portion broken away, showing the means by which the looped ends of two of the braking cables are attached thereto.

Spacers 76 are used during installation of the system to ensure proper braking cable tension. As shown in FIG. 5, the components of the system are assembled with the spacers 76 in place, following which the cables 52 are pulled taut and clamped in position by the nuts 70. The spacers are then removed, and the main bolt 60 is brought to full tightness on the motor shaft; this affords a degree of slack in the cables, permitting the bearing assembly to move away from the clamping collar 30 for free rotation.

Functioning of the fail-safe system is as follows: Assuming that the main bolt 60 breaks off or is otherwise disengaged from the motor shaft, the blade 44 would obviously be ejected from the housing of the machine if it were not caught by the braking cables 52. In the present system, when disconnection occurs the lower edge of the smaller bearing part 24 is thrust upon the confronting surface of the collar 30, which thereupon arrests any farther outward movement of the blade 44. The blade will however continue to rotate due to its momentum, and it will in turn rotate the housing 10 and the larger bearing part 22; because of its frictional interengagement with the collar 30, however, the smaller bearing part 24 will remain stationary with respect to the motor shaft. Thus, the bearing 12 serves to permit controlled free-wheeling action of the released blade; otherwise (such as if the housing were to contact the collar 30 directly), the resultant, non-yielding interengagement would tend to snap the braking cables.

Although FIG. 5 describes a phase in the assembly procedure, it might also be taken to show the relative positions of the parts upon release of the blade from the shaft (ignoring the bolt 60). As can be seen, the connecting cable is extended tautly between the blade 44 and the housing 10, and the lower edge of the smaller bearing part 24 is engaged against the collar 12, as described above.

Figure 7:
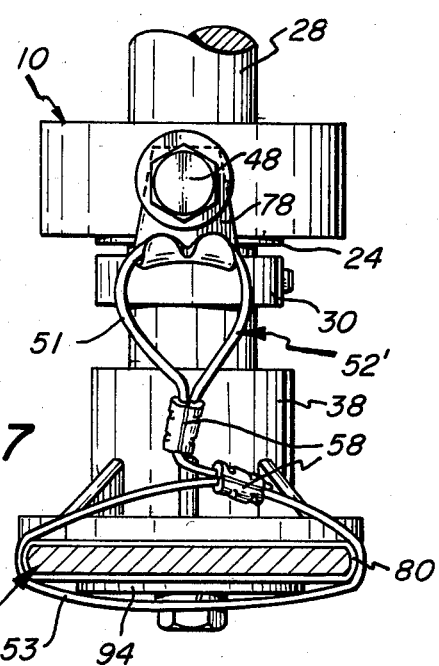
FIG. 7 is a fragmentary elevational view of the blade-mounting portion of a lawn mower, in partial section, showing a second form of fail-safe systems embodying the present invention.
Figure 8:
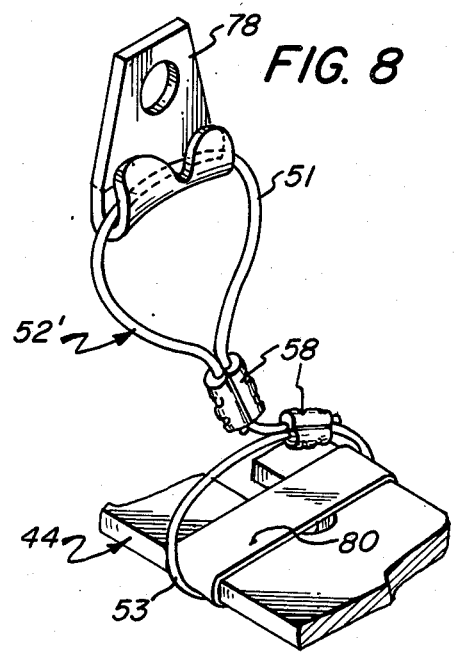
FIG. 8 is a fragmentary perspective view of the structure by which the opposite ends of the braking cable are connected to their associated components in the embodiment of FIG. 7.

FIGS. 7 and 8 illustrate an alternative embodiment of the invention wherein the braking cable 52' has loops 51, 53 formed at both ends and maintained by crimped sleeves 58. Rather than being supported directly on the bolt 48, as in the previously described embodiment, the loop 51 is held by a small metal hanger 78, which is in turn mounted by the bolt. The loop 53 at the opposite end of the cable 52' extends about the blade 44, which is encircled by a band 80 of cushioning material positioned under the loop; the band will typically be made of a rubbery material. As will be noted, the embodiment of these Figures achieves the objectives of the invention by use of only two, rather than four, braking cables.

Turning finally to FIGS. 9 and 10, in the embodiment therein illustrated an adaptor plate, generally designated by the numeral 82, is employed to join the braking cables 52 to the blade 44. FIG. 9 shows the plate in an initial phase of assembly (inverted from the position of actual use shown in FIG. 10), in which it is superimposed upon the surface of the blade with its longitudinally extending flange portions 84 aligned on the axis thereof. The four finger elements 86 are thereafter bent inwardly about the blade to tightly grip it and thereby provide a secure and rigid interconnection therebetween, as seen in FIG. 10. The four holes 88 formed through the laterally extending flange portions 90 provide the attachment means for the anchor bolts 68, which of course fasten the ends of the braking cables 62 in the manner described. This Figure also illustrates a slight variation in the construction of the clamping collar 30', which utilizes a secantally extending socket cap screw 92 to secure it upon the shaft portion 2, and it shows the use of a relatively large washer 94 for mounting of the blade.

As will be appreciated, variations can be made in the fail-safe system, as it is specifically described herein, without departing from the concept of the invention. For example, the nature of the bearing assembly may vary considerably, as long as means is provided for permitting the blade to rotate in a free-wheeling and yet controlled manner, independently of rotation of the motor shaft.

Thus, it can be seen that the present invention provides a novel fail-safe system which serves to prevent ejection of the blade of a rotary power-driven lawn mower upon accidental disconnection or failure of its normal mounting structure. The system is of symmetrical form, so as to introduce no imbalancing effect into the machine on which it is installed; it is relatively inexpensive to produce and facile to install, it is suited for use as an add-on assembly, and it can be employed with standard blades with no more than minimal modification thereof. The invention also provides a novel power-driven rotary lawn mower, into which a fail-safe system having unique and highly advantageous features is incorporated.

Having thus described the invention, what is claimed is:

1. A fail-safe system for the blade of a power-driven rotary lawn mower or the like, comprising:
    a bearing assembly comprised of an attachment member and a hub member journalled therewithin, said assembly having an axial passageway therethrough for slideable and rotatable mounting upon a cylindrical drive shaft;
    a retainer adapted for affixation to the drive shaft adjacent said bearing assembly, said retainer and assembly being so constructed as to permit engagement of said hub member with said retainer, free from interference with said attachment member; and
    means adapted to symmetrically connect said attachment member to a blade mounted upon the drive shaft of a rotary lawn mower with said retainer disposed between the blade and said attachment member.

2. The system of claim 1 wherein said bearing assembly comprises a housing, providing said attachment member, and a bearing comprised of two parts of generally annular configuration assembled with one another for relative rotation, one of said bearing parts being fixedly engaged within said housing and the other of said parts projecting axially therefrom for contact with said retainer, said other part providing said hub member.

3. The system of claim 2 wherein said retainer is a clamping collar adapted to encircle said drive shaft.

4. The system of claim 1 wherein said connecting means comprises a plurality of cables dimensioned to extend between said attachment member and a blade mounted in normal position upon the drive shaft.

5. The system of claim 4 wherein said connecting means additionally includes a plurality of anchor bolts adapted to attach said cables to the blade.

6. The system of claim 4 wherein each of said cables has a loop formed in one end thereof dimensioned to extend about the blade.

7. The system of claim 6 additionally including a cushioning element for each of said cables, said cushioning element being adapted to extend tightly about the blade at a location lying within the loop of the associated cable.

8. The system of claim 4 wherein said connecting means additionally includes an adaptor plate adapted for affixation to the blade and having means thereon for attachment of said cables.

9. The system of claim 1 additionally including a coupling fixture having a socket on one side adapted to engage the end of the lawn mower drive shaft, and having on the opposite side thereof a surface for stable seating of the blade.

10. In a power-driven, rotary lawn mower, the combination including:
    A. a cylindrical drive shaft having an outer end portion adapted to mount the lawn mower blade;
    B. a blade attached substantially at its center to said outer end portion of said drive shaft and extending diametrically thereof; and
    C. a fail-safe system for said blade, comprising:
        1. a bearing assembly comprised of an attachment member and a hub member journalled therewithin, said assembly having an axial passageway through which said drive shaft extends with said assembly slideably and rotatably mounted thereupon;
        2. a retainer affixed to said drive shaft between said bearing assembly and said blade, said retainer and assembly being so constructed as to permit engagement of said hub member with said retainer, free from interference with said attachment member; and
        3. means symmetrically connecting said attachment member to said blade.

11. The combination of claim 10 wherein said bearing assembly comprises a housing, providing said attachment member, and a bearing comprised of two parts of generally annular configuration assembled with one another for relative rotation, one of said bearing parts being fixedly engaged within said housing and the other of said parts projecting axially therefrom for contact with said retainer, said other part providing said hub member.

12. The combination of claim 11 wherein said retainer is a clamping collar encircling said drive shaft.

13. The combination of claim 10 wherein said connecting means comprises a plurality of cables extending between said attachment member and said mounted blade.

14. The combination of claim 13 wherein there are four of said cables, the points of attachment of said cables to said blade being equidistantly spaced from the longitudinal centerline of said blade, and equidistantly spaced from the transverse centerline thereof.

15. The combination of claim 14 additionally includes a plurality of anchor bolts attaching said cables to said blade.

16. The combination of claim 13 wherein there are two of said cables, each having a loop formed in one end thereof extending about said blade.

17. The combination of claim 16 additionally including a cushioning element for each of said cables, said cushioning element comprising a band extending about said blade and lying substantially within said loop of said cable associated therewith.

18. The combination of claim 13 wherein said connecting means additionally includes an adaptor plate affixed to said blade in a central position and having means thereon to which said cables are attached.

19. The combination of claim 10 additionally including a coupling fixture having a socket on one side thereof engaging said end portion of said drive shaft, and having on the opposite side thereof a generally planar surface against which a central portion of said blade abuts, the contacting surface of said central blade portion also being generally planar.

* * * * *